United States Patent [19]

Bettini

[11] 3,886,591

[45] May 27, 1975

[54] CASSETTE TAPE APPARATUS WITH AUTOMATIC CHANGER

[75] Inventor: Giuseppe Bettini, Ivrea, Italy

[73] Assignee: Ing. C. Olivetti & Co., S.p.A., Ivrea (Turin), Italy

[22] Filed: May 15, 1973

[21] Appl. No.: 360,696

[30] Foreign Application Priority Data

May 13, 1972 Italy .................................. 68506/72

[52] U.S. Cl. ................................ 360/92; 214/6 BA

[51] Int. Cl. ............................................ G11b 23/12

[58] Field of Search..... 360/92; 214/6 BA; 242/181; 274/4 G

[56] References Cited

UNITED STATES PATENTS

| | | | |
|---|---|---|---|
| 2,941,739 | 6/1960 | Burke et al. | 242/181 |
| 3,756,608 | 9/1973 | O'Neill et al. | 360/92 |
| 3,758,122 | 9/1973 | Kawaharasaki | 360/92 |
| 3,800,319 | 3/1974 | Fujimoto | 360/92 |

*Primary Examiner*—Stanley M. Urynowicz, Jr.
*Attorney, Agent, or Firm*—I. J. Schaefer

[57] ABSTRACT

This apparatus is used for automatically bringing a number of magnetic tape cassettes stacked in a loading magazine to a recording and/or playing back station and therefrom to a collecting magazine in such a manner that the lowermost cassette contained in the loading magazine is pushed in a movable container which is between said two magazines and after carried by said container from the plane of the magazines to the recording station. Successively the movable container carries the recorded cassette from the recording station to the plane of the magazines and a transfer mechanism pushes the recorded cassette into the collecting mechanism; simultaneously, the transfer mechanism brings the new lowermost cassette of the loading magazine to the movable container.

6 Claims, 9 Drawing Figures

Patented May 27, 1975 3,886,591

8 Sheets-Sheet 2

Patented May 27, 1975 3,886,591

8 Sheets-Sheet 4

Patented May 27, 1975 3,886,591

8 Sheets-Sheet 8

CASSETTE TAPE APPARATUS WITH AUTOMATIC CHANGER

BACKGROUND OF THE INVENTION

1. Field of the invention

The present invention relates to a cassette tape apparatus with automatic cassette changer, wherein the cassettes are of the type known commercially as a musicassettes and, more particularly, to an apparatus for automatically reading and/or playing back a cassette brought from a loading magazine and for successively pushing the cassette already read into a collecting magazine. The apparatus for recording and/or playing a magnetic cassette can be, for example, of the type described in my and Carlo Romano U.S. Pat. application Ser. No. 220,992 filed on Jan. 26, 1972 now patent number 3,838,459 .

1. Description of the prior art

It is known a device in which the cassettes, of a type similar to those mentioned above, are normally arranged in a collection box and are transported by a conveying band which transfers them to the reading station, turning them over in the course of the transfer. Such a device has, however, the defect of being able to handle only a limited number of cassettes, the collection box having, on account of constructional requirements, a limited capacity; furthermore, in such a device there is a further disadvantage in that the cassette changing operation takes a fairly long time, the cassettes having to cover a circular course in order to be brought to the reading station.

SUMMARY OF THE INVENTION

An object of the present invention is to provide for a cassette tape apparatus having a station at which a cassette containing magnetic tape can be recorded and/or played back, and a cassette changer adapted to transfer cassettes from a loading magazine to the cassette station and therefrom to a collecting magazine, the cassette station being arranged between the two magazines and a transfer mechanism being arranged to transfer cassettes in a plane spaced from the loading station from the loading magazine to a movable container between the magazine and from the movable container to the collecting magazine, the container being movable to carry a cassette therein from said plane into the cassette station and vice versa.

The cassette changer can be an independent attachment to the recording and/or playback apparatus.

Preferably, said plane is horizontal and lies above the cassette station, the collecting magazine having a base portion for supporting a stack of cassettes and at least said base portion being coupled to the movable container to rise as the movable container lowers cassette into the cassette station, and vice versa, means being provided for preventing cassettes stacked in the collecting magazine dropping as said base portion falls, said base portion, the bottom of the loading magazine and the movable container defining said plane when said base portion is lowered and the movable container is raised.

The apparatus according to the invention can be so arranged that the transfers of one cassette from the loading magazine to the movable container station and of another cassette from the container to the collecting magazine are effected simultaneously.

To this end, the transfer mechanism can comprise a transfer plate slidable parallel to the said plane to push a cassette from the loading magazine into the movable container, an oscillating arm arranged to push a cassette from the container into the collecting magazine and a common drive member for actuating the transfer plate and the oscillating arm when the said base portion is lowered and the movable container is raised.

BRIEF DESCRIPTION OF THE DRAWINGS

The invention will be described in more detail, by way of example, with reference to the accompanying drawings, in which.

DESCRIPTION OF A PREFERRED EMBODIMENT OF THE INVENTION

Figure 1:
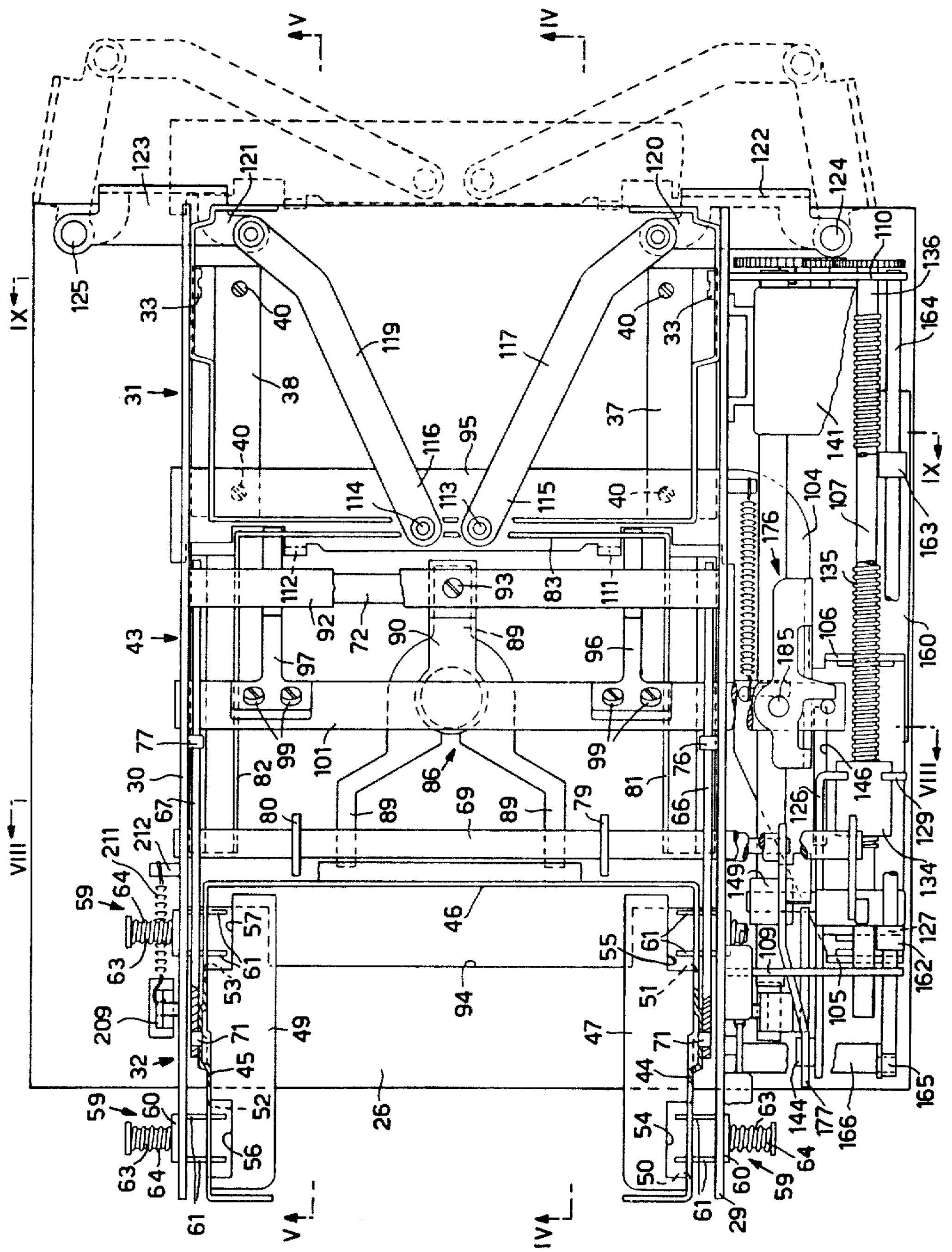
FIG. 1 is a plan view of an apparatus embodying the invention.

In the present embodiment, apparatus for the recording and/or playback comprises a base 10 (FIG. 2), on which there are mounted two shafts 11 and 12 (FIGS. 4, 5 and 7) which engage in the hubs of the tape-carrying spools of the cassette in order to effect the unwinding and winding of the tape. Two capstans 13 and 14 are capable of lodging in suitable holes of the cassette in order to effect the advance of the tape in the two directions of travel.

Parallel to the base and sliding on guides 15 (FIGS. 2 and 3) there is arranged an actuation plate 16 supporting a recording and/or playback head 17. Such an actuation plate 16 can assume two predetermined positions under the control of a suitable actuator, for example, an electro-magnet, now shown in the Figures.

In order to position the cassette with regard to the recording and/or playback station constituted by the head 17, there are arranged on the base 10 two vertical support plates 19 on which the cassette rests. The cassette also rests on shoulders 20 of two positioning pins 21 which fit into suitable holes in the cassette. Arranged below the base 10 is a plurality of microswitches 22, for checking the presence and the position of the cassette. To this end, the push-button of each microswitch 22 is actuated by the lower end of a sensing lever 23 hinged on a pin 24 in the base 10 and having a lateral project 25 engaged by the rear wall of the cassette.

The cassette changer is arranged above the recording and/or playback apparatus and comprises a base plate 26 (FIGS. 1 and 2) parallel to the base 10 and supported by a series of support columns 27.

Figure 4:
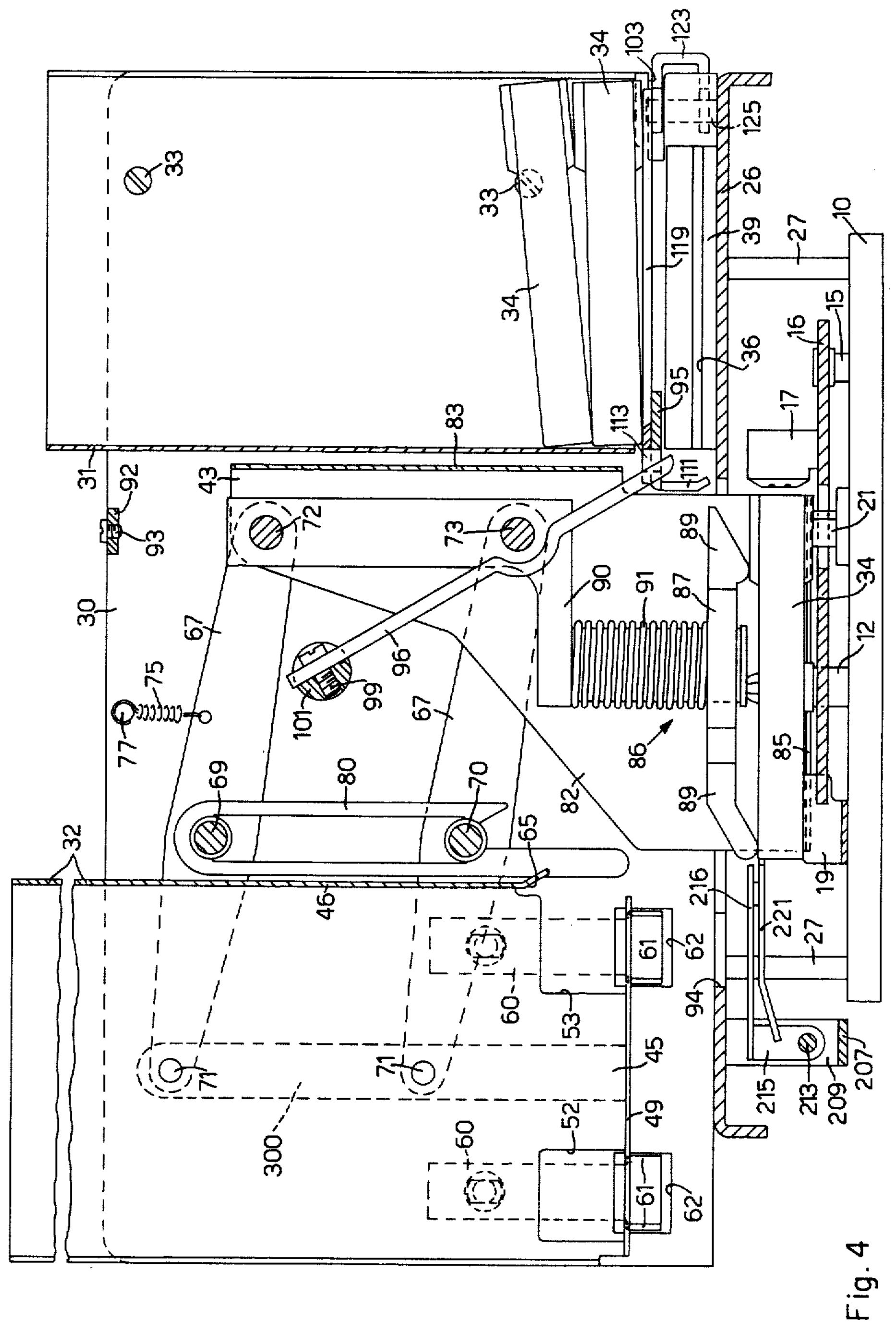
FIG. 4 is a section along the line IV—IV of FIG. 1.
Figure 5:
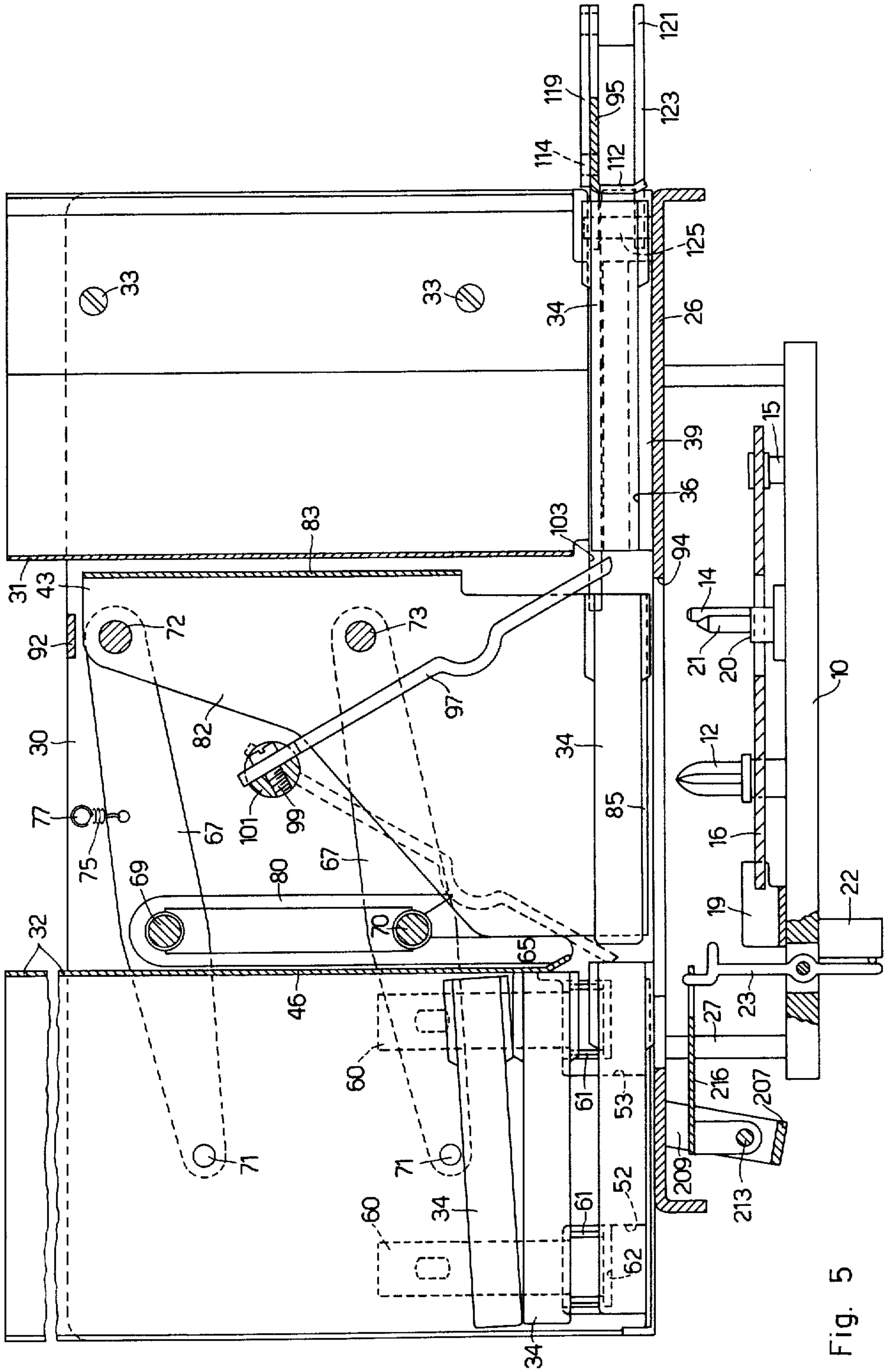
FIG. 5 is a section along the line V—V of FIG. 1, and shows the apparatus in a second working position.
Figure 9:
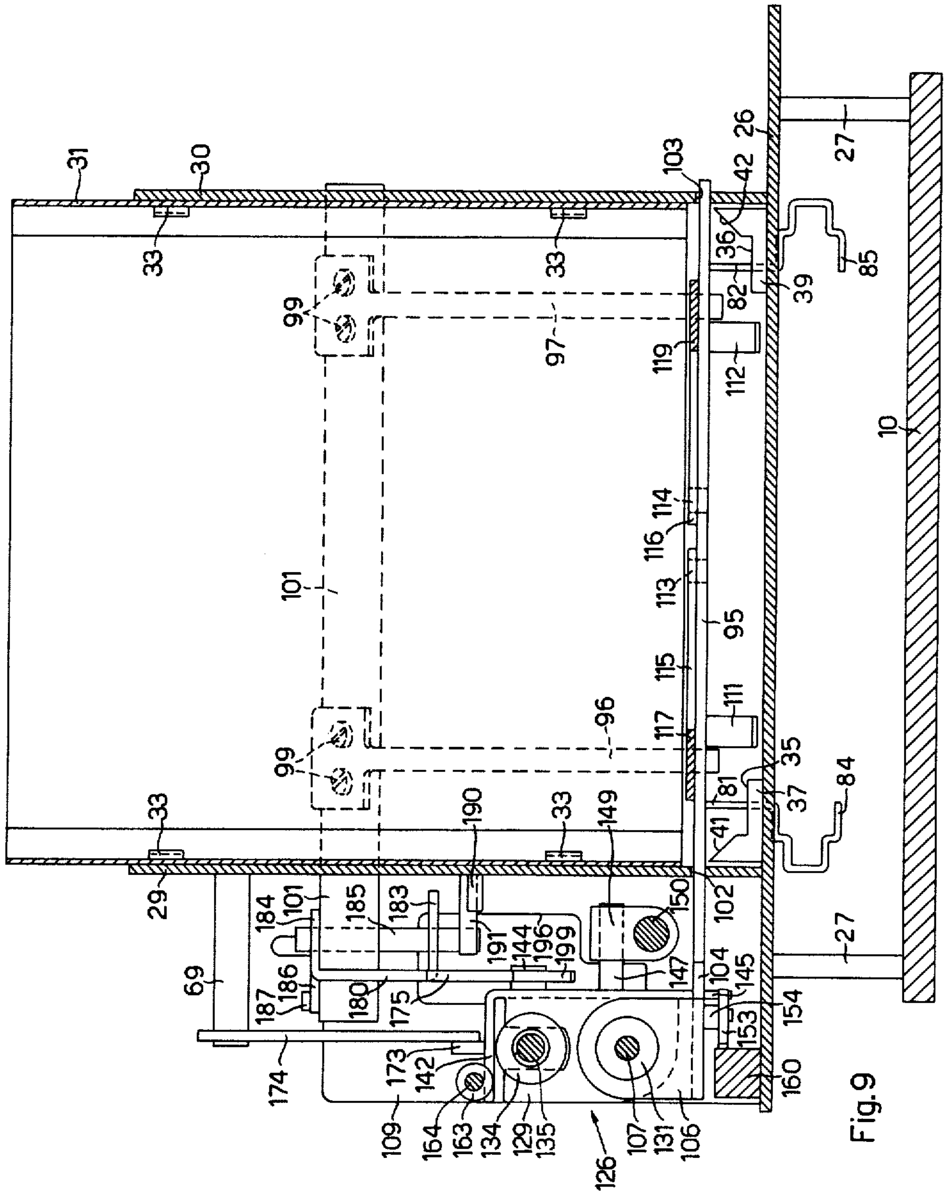
FIG. 9 is a section along the line IX—IX of FIG. 1.

On the plate 26, and perpendicular thereto, there are mounted two side walls 29 and 30, parallel one to the other, between which there are arranged a loading magazine 31 and a collection magazine 32, both extending vertically above the plate 26. The loading magazine 31 is fixed to the walls 29 and 30 by means of screws 33 and is shaped in such a way as to be able to contain a plurality of cassettes 34 stacked on top of each other (FIG. 4). The cassette 24 at the bottom of the stack rests normally on two reference ledges 35 and 36 (FIGS. 5 and 9) of two guide blocks 37 and 39, fixed by means of screws 40 to the plate 26 parallel to the walls 29 and 30. The blocks 37 and 39 are shaped so as to have two chamfered edges 41 or 42 for guiding the cassettes towards the reference ledges 35 and 36.

The loading magazine 31 is spaced from the plate 26 so as to allow the transfer of the cassette 34 from the blocks 37 and 39 on which it rests to a container 43 arranged between the magazine 31 and the collection magazine 32.

The collection magazine 32 receives the cassettes 34 subsequent to recording or playback and, unlike the loading magazine 31, is not fixed to the walls 29 and 30. The magazine 32 has a substantially parallel pipedal shape and comprises two lateral walls 44 and 45 (FIGS. 1 and 3) parallel to the walls 29 and 30 and a front wall 46 spanning the lateral walls. The lateral walls 44 and 45 of the magazine 32 are, at the bottom, bent inwards so as to form two flanges 47 and 49 which constitute the base of the magazine. In the lower part of each side wall 44 and 45 there are formed two apertures 50 and 51, or 52 and 53 respectively, adjacently to which, on the flanges 47 and 49, there are formed similar apertures 54 and 55, or 56 and 57 respectively.

On the outer surfaces of the walls 29 and 30, in correspondence with the apertures 50, 51, 52 and 53 of the magazine 32, there are fixed four spring-loaded catches 59, each constituted by a plate 60 at the lower end of which there are fixed two tongues 61 lodged in suitable holes 62 through the walls 29 and 30. The lower edges of the tongues 61 are inclined. Each stop 59 is supported by a pin 63, perpendicular to the walls 29, 30, concentrically to which there is arranged a helical spring 64 which keeps the corresponding plate 60 pressed against the walls 29, 30.

In the lower part of the front wall 46 there is formed a window 65 (FIGS. 5 and 8) through which the cassette 34 can enter into the magazine 32 and rest on the flanges 47 and 49.

The collection magazine 32 and the container 43 are connected to one another by two pairs of rocking levers 66 and 67 mounted on two shafts 69 and 70 pivoted in the walls 29 and 30 so that to a movement downwards of the movable container 43 there corresponds a movement upwards of the movable magazine 32 and vice versa. In particular, each lever 66 and 67 is connected to the magazine 32 by means of a pin 71, whilst the connection between the levers 66 and 67 and the container 43 is realized by means of two shafts 72 and 73. Two springs 74 and 75 are stretched between the levers 66 and 67 and two pins 76 or 77 on the walls 29 and 30 to keep the container 43 normally raised.

To prevent the cassette 34 contained in the magazine 32 from emerging from the window 65 when this magazine is at the upper end of its travel, on the shafts 69 and 70, between the rocking levers 66 and 67, there are arranged two fixed vertical stirrups 79 and 80.

The movable container 43 is constituted by two side walls 81 and 82 (FIGS. 1 and 5) parallel to the walls 29 and 30 and connected to one another by a front wall 83. The lower ends of the walls 81 and 82 are shaped and bent inwards so as to form two horizontal flanges 84 and 85 (FIGS. 7 and 9) on which the cassette 34 can rest.

To keep the cassette 34 constantly pressed against the flanges 84 and 85 of the movable container 43, between the side walls 81 and 82 and in a substantially central position, there is arranged a presser 86 (FIGS. 1 and 4) constituted by a central body 87 from which there extend three appendages 89 arranged to press on the upper wall of the cassette 34. The presser 86 is supported by the lower part of an arm 90 supported by the shafts 72 and 73. The force necessary for creating the pressure on the cassette 34 is supplied by a helical spring 91 (FIG. 4) arranged concentrically to the lower part of the arm 90. Above the container 43, supported by the walls 29 and 30, there is arranged a horizontal stop bar 92 on which, in a substantially central position, there is mounted an adjusting screw 93 capable of collaborating with the upper part of the arm 90 to limit the travel upwards of the movable container 43.

The movable container 43 is capable of transferring the cassette 34 from the plane of the magazines 31, 32 to the plane of the recording and/or playback station 17. To this end, in the base plate 26 there is formed an aperture 94 through which the container can pass from one to the other of the said planes.

The transfer of the cassettes 34 from the loading magazine 31 to the movable container 43 and from this latter to the collection magazine 32 is effected by a transfer plate 95 and by two oscillating arms 96 and 97. These latter are parallel one to the other and are fixed, for example by means of screws 99, to a single shaft 101 pivoted in the walls 29 and 30 and arranged above the movable container 43.

The transfer plate 95 is arranged, below the loading magazine 31, parallel to the base plate 26 and is slidable in two horizontal slits 102 and 103 (FIGS. 2 and 5) in the walls 29 and 30. The plate 95 has one end 104 projecting from the wall 29 provided with two vertical guide lugs 105 and 106 sliding on a shaft 107 supported by two brackets 109 and 110 arranged, parallel one to the other, outside the wall 29 and perpendicular both to this wall and to the plate 26 which supports them.

The plate 95, in the length comprised between the two walls 29 and 30, is provided with two vertical thrust tongues 111 and 112 (FIG. 9) turned downwards and is provided with two pins 113 and 114 on which there are pivoted the ends 115 and 116 of two support levers 117 and 119 respectively, having the opposite ends pivoted on the ends 120 and 121 respectively, of two hinges 122 or 123 respectively fulcrummed on two pins 124 and 125 on the base plate 26.

A carriage 126 (FIGS. 1 and 2) is arranged between the lugs 105 and 106 of the plate 95 and is provided with two lugs 127 and 129 by means of which it can slide on the guide shaft 107. The lugs 105 and 106 of the plate 95 and the lugs 127, 129 of the carriage 126, in order to slide better on the shaft 107, are provided with bushes 130, 131 or 132, 133 respectively.

The upper part of the lug 129 is keyed to a nut 134 riding on a lead screw 135 journalled in the brackets 109 and 110 and having one end 136 keyed to a toothed wheel 137 in mesh, through an idle gear 139, with a pinion 140 of an electric motor 141 fixed to the wall 29. The control of the motor 141 will be described hereinafter.

The carriage 126 is shaped so as to have, at the top, a horizontal plate 142 (FIG. 9), with a lateral tongue 143, extending parallel to the wall 29 and provided at the end with a pin 144. At the bottom is a tooth 145 lodged in a slotted hole 146 in the part 104 of the plate 95. For a greater stability of the carriage 126, a horizontal pin 147 connects the carriage rigidly to a bush 149 slidng on a cylindrical guide 150 parallel to the shaft 107 and supported by the brackets 109 and 110.

Figure 6:
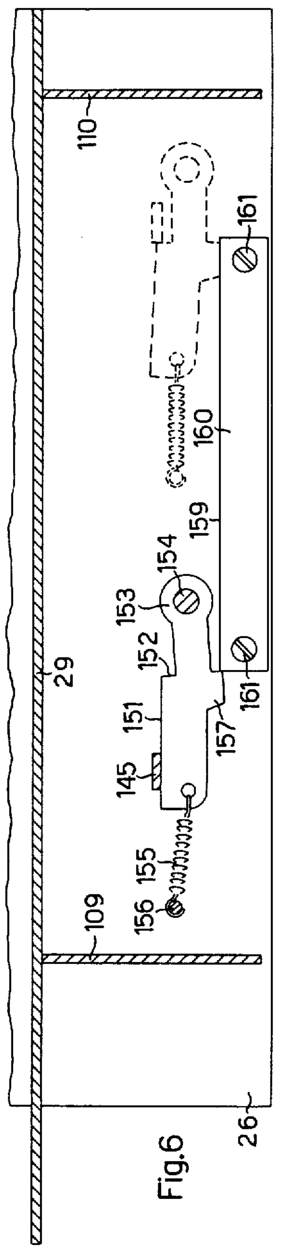
FIG. 6 is a partial section along the line VI—VI of FIG. 2.

The tooth 145 of the carriage 126 (FIGS. 2 and 6) can collaborate with an edge 151 and a shoulder 152 of a lever 153 arranged below the part 104 of the plate 95 and pivoted on a pin 154 of this latter. The lever 153, which is parallel to the base plate 26, is connected elastically, for example through a spring 155, to a pin 156 of the plate 95, and is provided with a tooth 157 capable of collaborating with a flank 159 of a fixed straight edge fixed to the plate 26 by screws 161, (FIG. 6). The horizontal plate 142 of the carriage 126 can collaborate with two collars 162, 163 of a horizontal rod 164 (FIG. 3) sliding in the brackets 109 and 110. One end 165 of the rod 164 is connected to the lower end of a lever 166 pivoted on a pin 167 of the wall 29. The lever 166 is capable of collaborating alternately with two push-buttons 169, 170 of two microswitches 171 and 172 respectively.

The plate 142 of the carriage 126 collaborates also with a roller 173 (FIG. 8) of a lever 174 keyed on the shaft 69 (FIG. 3) which controls the displacements in the vertical sense of the movable container 43 and of the collection magazine 32.

The pin 144 of the carriage 126 collaborates with a lower appendage 175 of an actuation member 176 and with an arm 177 of a lever 179. The actuation member 176 (FIG. 2) comprises a flat body 180 substantially in the shape of a Y constituted by the appendage 175 and by two arms 181 and 182, a first tongue 183 orthogonal to the body 180 at the junction between the arms 181, 182 and the appendage 175, a second tongue 184 spanning the upper ends of the arms 181 and 182 and bent parallel to the tongue 183. The tongues 183 and 184 are pivoted on a single pin 185 keyed through the shaft 101 which controls the oscillating arms 96 and 97.

The tongue 184 is provided with a tooth 186 capable of collaborating with a stop peg 187 (FIG. 9) keyed on the shaft 101 parallel to the pin 185. A spring 188 (FIG. 2) is stretched between one end of the tongue 183 and a pin 190 of the wall 29. A fixed pin 191 of the wall 29 is capable of collaborating with the lower part of the pin 185 in order to limit the rotation of the shaft 101 about its axis.

The lever 179 (FIG. 2) is pivoted on a pin 192 of the wall 29 and is normally kept against a fixed stop 193 by the action of a spring 194 stretched between the upper end of the bracket 109 and one end 195 of the lever 179. This lever, which is partially housed in a slot 196 through the bracket 109, is provided with a lug 197 capable of collaborating with a tooth 199 of the appendage 175 of the actuation member 176.

The pin 147 which connects the carriage 126 to the bush 149 is capable of collaborating with a concave end 201 of a lever 202 connected to the upper end 203 of a lever 204 pivoted on a pin 205 of the wall 29. The lever 204 is arranged in a substantially vertical position and, through an aperture 206 of the plate 26, extends underneath the plate 26 itself. A horizontal bar 107 connects the lower end of the lever 204 to the lower end of a lever 209 (FIG. 4) pivoted on a pin 210 (FIG. 8) of the wall 30. A spring 211 (FIG. 1) is stretched between the upper end of the lever 209 and a pin 212 of the wall 30.

Figure 7:
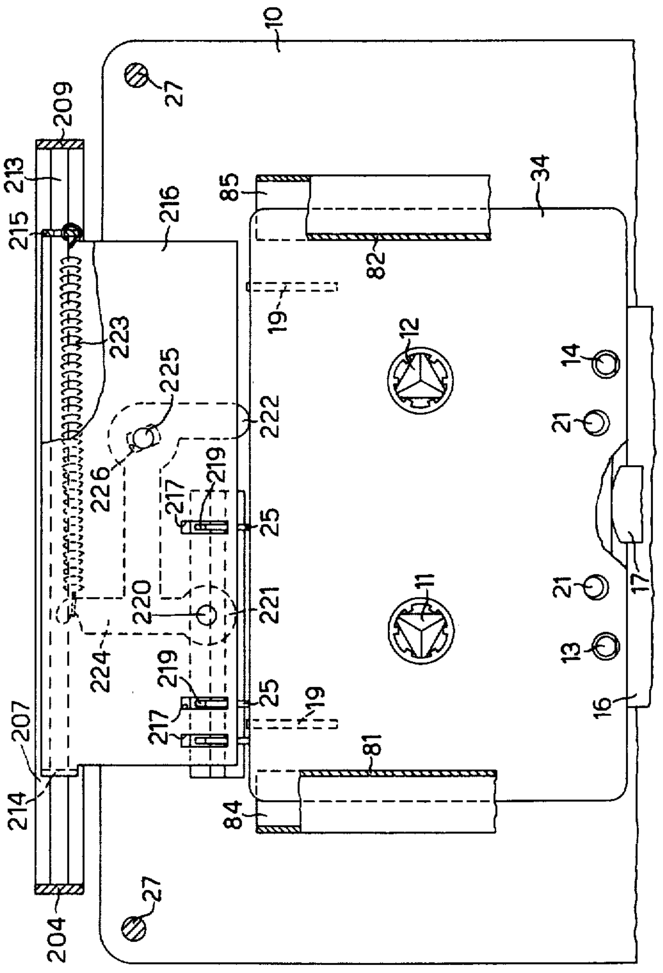
FIG. 7 is a partial section along the line VII—VII of FIG. 2.

Between the levers 204 and 209 there is arranged a shaft 231 (FIG. 2) on which there are pivoted two vertical lugs 214 and 215 of a horizontal plate 216, (FIG. 7). The horizontal plate 216 is provided with a plurality of slits 217 in each of which there is housed an upper projection 219 of a sensing lever 23.

Pivoted on a pin 220 of the plate 216, and below the latter, there is arranged a lever 221 (FIG. 7) having an arm 222 capable of collaborating with the rear part of the cassette 34 in order to thrust this latter against the positioning pins 21. A spring 223, stretched between an arm 224 of the lever 221 and the lug 215 of the plate 216 creates the pressure on the cassette 34. A peg 225 of the plate 216 is lodged in a slotted hole 226 of the lever 221 in order to limit the travel thereof.

Figure 2:
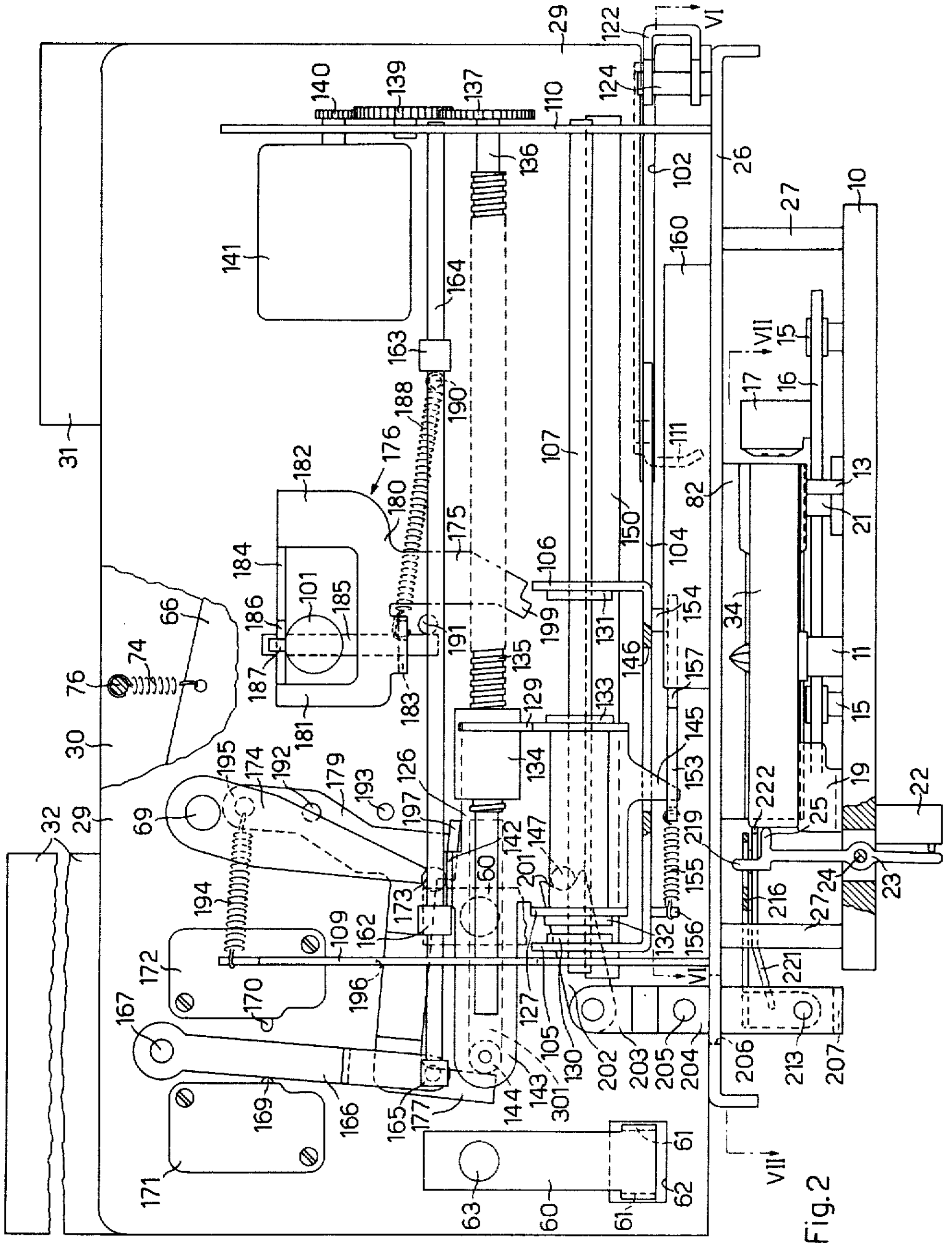
FIG. 2 is a side view of the apparatus in the position of rest.

In the condition of rest (FIGS. 1, 2, and 4), the motor 141 is stopped with the carriage 126 completely shifted towards the left in FIG. 2, i.e., to the back of the apparatus. In this position, the movable container 43 is shifted downwards and a cassette 34 therein rests at the front on the shoulders 20 of the pins 21 and at the back on the plates 19 of the recording and/or playback apparatus, urged down by the presser 86 under the action of the spring 91. The cassette is thrust against the positioning pins 21 by the lever 221 and the sensing levers 23 are free to sense the presence and the position thereof. The projections 25 can cooperate with cutouts of known form in the back of the cassette to distinguish between unrecorded and recorded tapes, for example. The actuation plate 16 is free to be actuated in order to bring the recording and/or playback head 17 in contact with the exposed face of the magnetic tape contained in the cassette, and in order to engage a pressure roller (not shown) with a selected one of the capstans 13 and 14.

Figure 8:
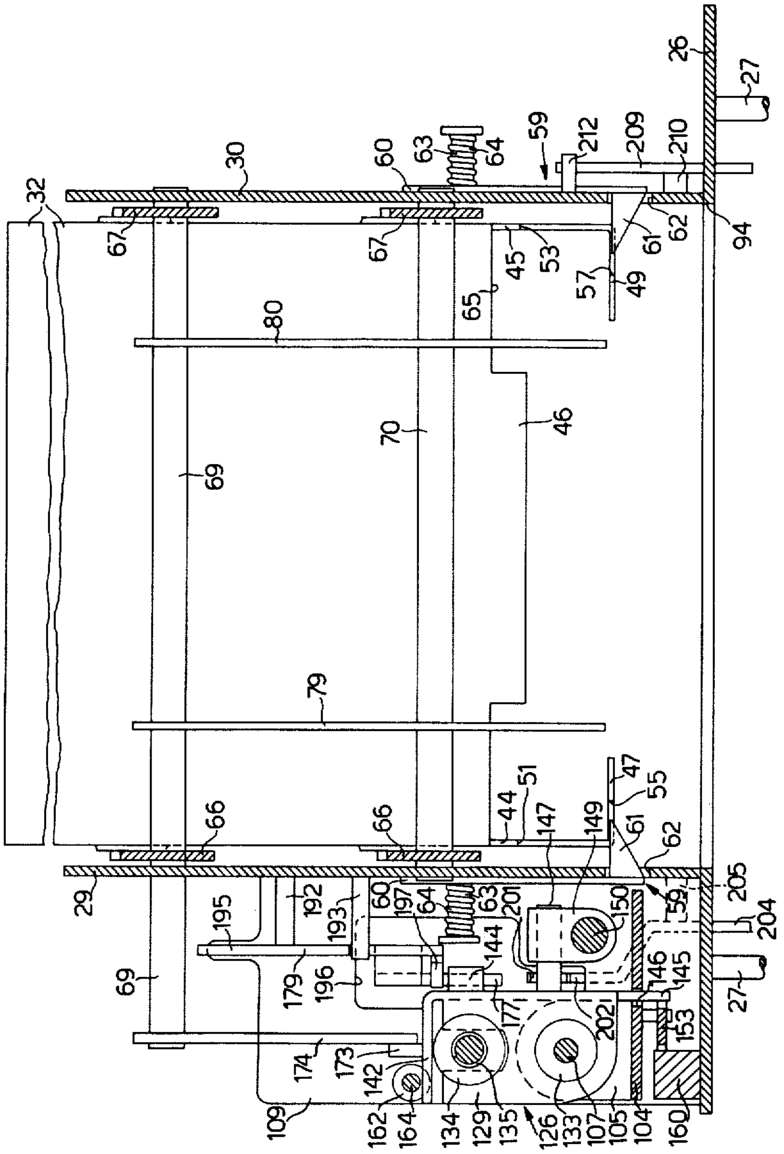
FIG. 8 is a partial section along the line VIII—VIII of FIG. 1.

The movable magazine 32 is shifted upwards and its flanges 47 and 49 are at a level slightly superior to that of the tongues 61 of the catches 59 (FIG. 8).

The transfer plate 95 is completed shifted towards the left in FIG. 1 and its support levers 117 and 119 support the pile of cassettes 34 contained in the loading magazine 31. The oscillating arms 96 and 97 are arranged with their lower ends adjacent the loading magazine 31. Furthermore, the tongue of the carriage 126 presses on the collar 162 of the rod 164, keeping the lever 166 pressed against the push-button 169 of the microswitch 171 which is therefore closed whilst the microswitch 172 remains open.

Let it be assumed that it is desired to replace automatically a cassette after it has been recorded or played back by the head 17. In order to set the changer cycle in motion, one starts up the motor 141 for example, by pressing a start push-button, not shown. The motor 141, through the gears 140, 139 and 137, rotates the lead screw 135 which brings about the displacement towards the right (FIG. 2) of the nut 134 and of the carriage 126 connected to it. The displacement towards the right of the carriage 126 brings about first of all the opening of the microswitch 171. This operates a relay which ensures that the motor continues to be energized even when the start push-button is released. At the instant when the tongue 142 of the carriage 126 ceases to collaborate with the collar 162, also the pin 147 which connects the carriage 126 to the bush 149 ceases to collaborate with the lever 202.

The levers 204 and 209, through the action of the spring 211, rotate in the clockwise direction (FIGS. 3 and 5) and shift the horizontal plate 216 towards the left. The sensing levers 23 and the thrust lever 221 are thus withdrawn from the rear wall of the cassette 34 which has to be replaced.

With a subsequent displacement of the carriage 126 towards the right, the plate 142 ceases to collaborate with the roller 173 of the lever 174 whic controls the movement of the magazine 32 and of the container 43.

The springs 74 and 75, no longer being opposed, bring the container 43 upwards, consequently bringing the collection magazine 32 downwards. The travel upwards of the container 43 is terminated when the upper part of the arm 90, integral with it, comes into contact with the adjusting screw 93 of the stop bar 92. In this way, the cassette 34 which it is desired to replace is transferred from the plane of the recording and/or playback station to that of the magazines 31 and 32.

When the bush 133 of the carriage 126 meets the bush 131 of the transfer plate 95, the tooth 145 of the carriage 126, after having slid along the edge 151 of the lever 153 (FIG. 6), reaches the shoulder 152. The spring 155, no longer being opposed by the tooth 145, causes the lever 153 to rotate slightly in the clockwise direction about its pin 154 and causes the tooth 157 to collaborate with the flank 159 of the fixed straight edge 160.

Figure 3:
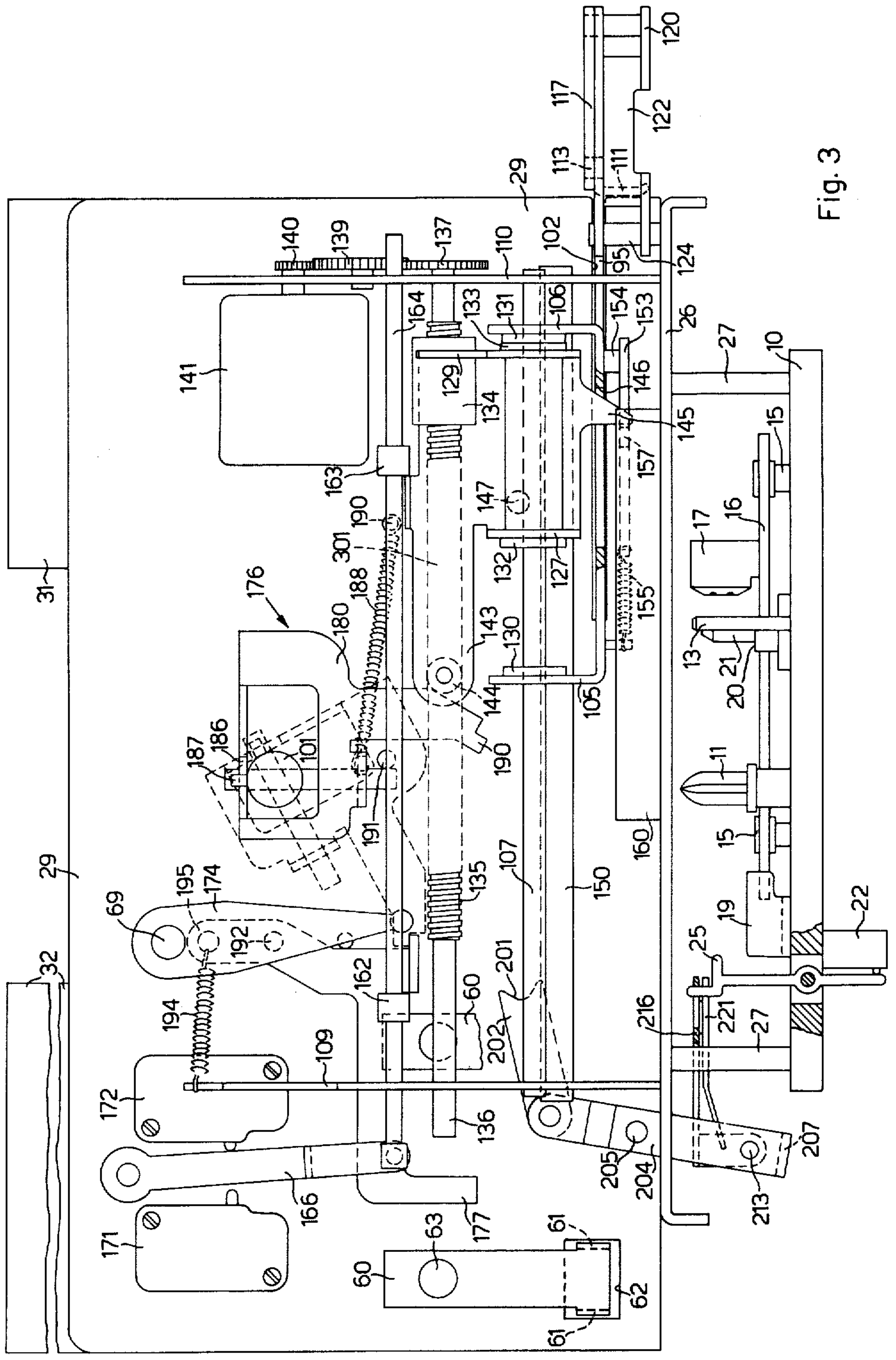
FIG. 3 is a side view of the apparatus in a first working position.

When the bushes 133, and 131 come into contact one with the other, also the transfer plate 95, thrust by the carriage 126, begins to shift towards the right (FIG. 3). The pin 144 of the carriage 126, when it comes into contact with the lower appendage 175 of the actuation member 176, causes this latter to rotate about its own pin 185, overcoming the action of the spring 188. The rotation about the shaft 101 is, on the contrary, prevented by the stop pin 191.

When the pin 144 is about to go beyond the appendage 175 of the member 176, the plate 142 of the carriage 126 begins to bear against the collar 163 of the rod 164. When the pin 144 has completed jumping past the appendage 175, the plate 142 thrusts the rod 164 to the right and brings the lever 166 against the push-button 170 of the microswitch 172, closing this switch. AT the same time, the transfer plate 95 completes its travel to the right, moving into the position shown in broken lines in FIG. 1. The pile of cassettes 34 contained in the loading magazine 31 thus drops downwards until the cassette at the bottom of the stack, guided by the inclined planes 41 and 42, rests on the reference ledges 35 and 36 of the guide blocks 37 and 39.

With the closure of the microswitch 172, there is brought about the reversal of the movement of the motor 141 and therefore of the screw 135. The nut 134 and the carriage 126 connected to it thus shift towards the left (FIG. 3).

The carriage 126, with the displacement towards the left (FIGS. 2 and 3), brings its pin 144 into contact with the right-hand lateral edge of the lower appendage 175 of the actuation member 176. At the same time, its tooth 145 moves into contact with the shoulder 152 of the lever 153 fixed to the transfer plate 95. With a subsequent shift towards the left of the carriage 126, the pin 144 causes the actuation member 176 and the shaft 101 to rotate in the clockwise direction about the axis of this latter, overcoming the action of the spring 188. The rotation of the actuation member 176 about its pin 185 is, on the contrary, prevented by the stop pin 187 which collaborates with the tooth 186 of the tongue 184.

The rotation in the clockwise direction of the shaft 101 causes the oscillating arms 96 and 97 to oscillate from the right to the left (FIG. 5), pushing the used cassette 34 from the movable container 43 into the collection magazine 32. The rotation of the shaft 101 about its axis continues until the tooth 199 of the appendage 175 of the actuation member 176 hooks on to the lug 197 of the lever 179 (position shown in broken lines in FIG. 3).

At the same time as the transfer of the used cassette from the container 43 to the collection magazine 32, there is performed the transfer of the new cassette from the loading magazine 31 to the movable container 43. The tooth 145 of the carriage 126, engaging the shoulder 152 of the lever 153 of the transfer plate 95, thrusts this latter from the right to the left (FIGS. 1 and 3) and the cassette 34 which is resting on the blocks 37 and 39 is thrust by the tongues 111 and 112 of the plate 95 into the container 43. The cassette above the one withdrawn will drop on to the support levers 117 and 119.

The transfers of the cassettes from the loading magazine 31 to the movable container 43 and from this latter to the collection magazine occur simultaneously but are executed at different speeds. The transfer of the cassette from the container 43 to the collection magazine 32 takes place more rapidly than the transfer of the cassette from the loading magazine 31 to the container 43, in order to prevent the two cassettes from interfering with one another.

The carriage 126 in fact, by dragging directly the transfer plate 95, imparts to this latter its same speed of transfer. The tangential velocity of the oscillating arms 96 and 97 (which is substantially equal to that of transfer of the cassette from the container 43 to the collection magazine 32) is, on the contrary, greater, since the distance between their lower ends and the shaft 101 is greater than that between the point at which the pin 144 collaborates with the appendage 175 and the shaft 101.

Continuing its travel towards the left (FIG. 3), the carriage 126 causes its plate 142 to collaborate with the roller 173 of the lever 174 which controls the vertical displacements of the container 43 and of the collection magazine 32. This happens when the transfer plate 95 has concluded its travel and the tooth 157 of the lever 153, having cleared the flank 159 of the fixed straight-edge 160 and thrust by the tooth 145 of the carriage 126, moves into the initial position of rest (FIG. 6).

With a subsequent shift towards the left, the carriage 126 with its plate 142 which collaborates with the roller 173 of the lever 174, causes this latter to rotate in the clockwise direction, overcoming the action of the springs 74 and 75 and brings the container 43 downwards and the collection magazine 32 upwards.

With the displacement downwards of the movable container, the new cassette comes to rest at the front on the shoulders 20 of the pins 21 and at the rear on the plates 19 of the recording and/or reading apparatus, pressed by the presser 86 through the action of the spring 91.

With the displacement upwards of the collection magazine 32, the used cassette, which rests on the lower flanges 47 and 49 of the magazine 32, overcomes the action of the springs 64 and carries outwards the tongues of the catches 59. When such travel upwards is finished, the catches 59 jump back beneath the cassette, being at a level slightly lower than that of the flanges 47 and 49 which support the cassette 34. When, in the next changing cycle, the magazine 32 is lowered, the catches 59 hold up the stack of cassettes therein to leave space below the stack for insertion of another cassette from the container 43. The stacking of the cassettes 34 in the collection magazine 32 therefore takes place from the bottom upwards.

Continuing its travel towards the left (FIG. 5), the carriage 126 causes its plate 142 to collaborate with the collar 162 of the rod 164. Furthermore, the pin 144 of its lateral tongue 143 moves into contact with the arm 177 of the lever 179. The plate 142 of the carriage 126 pushes the collar 162 and causes the lever 166 to activate the pushbutton 169 of the microswitch 171, so stopping the motor 141. The pin 144 rotates in the clockwise direction the lever 179, overcoming the action of the spring 194, and unhooks the tooth of the appendage 199 from the lug 197, so allowing the actuation member 176 to return into the position of rest through the action of its spring 188. Also the oscillating arms 96 and 97 return thus into their position of rest.

At the same time as this, the pin 147 which connects the carriage 126 to the bush 149 engages with the concave end 201 of the lever 202 and brings the levers 204 and 209 into the position of rest, overcoming the action of the spring 211. The horizontal plate 216 is shifted to the right (FIGS. 2 and 3) and the sensing levers 23 are free again to sense the cassette, while the lever 221 thrusts the cassette 34 against the reference pins 21.

With the stoppage of the motor 141 there is concluded the changing cycle and the plate 16 can be actuated afresh in order to bring the head 17 into contact with the exposed face of the tape contained in the cassette.

Among possible modifications, may be mentioned the following. When the apparatus is provided with detectors for the start and finish of the tape contained in the cassette, the start-up of the cycle for the replacement of a cassette, instead of being actuated manually by means of a push-button, can be automated for example, by using the impulse which the detectors generate when the tape contained in the cassette has been completely recorded or played back.

Furthermore, in order to reduce the moving mass, the loading magazine 32 can be fixed to the walls 29 and 30. In this case, there are subjected to the vertical movement only the base flanges 47 and 49, which must be separate from the body of the magazine 32 itself. The tongues 47 and 49 are then connected to the rocker levers 66 and 67 for example, through two vertical levers 300 (shown in broken lines in FIG. 4).

Another modification which could be made to the device in order to reduce the number of components is that of replacing the pin 144 of the tongue 143 with a bar 301 (shown in broken lines in FIGS. 2 and 3) fixed to the inside of the tongue 143. In this way, during the return travel of the carriage 126 the bar 301 knocks against the right-hand side edge of the lower appendage 175 of the actuation member 176, causing this latter to rotate in the clockwise direction. Such a rotation continues until the lower part of the appendage 175 remains rested on the bar 301, and namely until the transfer plate 95 has concluded its travel towards the right. With a subsequent displacement towards the left of the carriage 126, the appendage 175 unhooks from the bar 301 and the actuation member 176 returns into the position of rest. By replacing the pin 144 by the bar 301, one can eliminate the lever 195, the spring 196 and the tooth 190.

What I claim is:

1. In a cassette tape apparatus having a station at which a cassette containing magnetic tape can be recorded and/or played back, a cassette changer comprising:

a loading magazine wherein cassettes to be used are stacked, a collecting magazine adapted to stack used cassettes therein, said loading and collecting magazines having horizontal bottom planes adapted to support the lowermost stacked cassette thereon, said station being disposed between said loading and said collecting magazines in a station plane below said bottom planes, a container movable between said bottom planes and said station plane, means for moving the movable container to align same with said bottom planes when a used cassette is to be replaced, means coupling the bottom plane of said collecting magazine to said movable container to raise said collecting magazine as said container moves into said station plane and to lower said collecting magazine as said container moves to said bottom planes wherein the stroke of the bottom plane of said collecting magazine exceeds the thickness of a cassette whereby said bottom planes and said container are aligned when the bottom plane of said collecting magazine is lowered and said container is raised, means for preventing the used cassettes stacked in said collecting magazine from dropping as the corresponding bottom plane is lowered comprising spring loaded catches mounted to coact with the lowermost one cassette in said collecting magazine to ride on same as the bottom plane of said collecting magazine rises, and transfer means for simultaneously transferring the lowermost one of the cassettes to be used from said, loading magazine to said container and the used cassette from said movable container to said collecting magazine when said container is aligned with said bottom plane, said transfer means comprising a slidable transfer plate mounted parallel to said bottom planes for pushing the lowermost one cassette to be used fromt said loading magazine into said container, an oscillatable arm pushing the used cassette from said container into said collecting magazine when actuated and a common drive means for actuating said transfer plate and said oscillatable arm when the bottom plane of said collecting magazine is lowered and said container is raised, said common drive means comprising a carriage, means slidably mounting the carriage for movement through a forward and a return stroke between two extreme positions comprising a fixed guide, a reversible motor for moving the carriage and a first and a second actuatable limit switch actuated in response to said carriage being in said extreme positions for respectively controlling the stopping and the reversing of the motion of said motor.

2. A cassette changer according to claim 1, wherein said coupling means comprises a rocking lever actuatable by said common drive member.

3. A cassette changer according to claim 1, further comprising a biasing spring urging the movable container and the bottom plane of said collecting magazine to their raised and lowered positions respectively, and means for lowering and raising said container and the bottom plane of said collecting magazine respectively when the carriage is at the end of said return stroke including a lever disposed in the trajectory of said carriage.

4. A cassette changer according to claim 1, wherein said carriage includes means for pushing said transfer for plate outside said loading magazine as said carriage moves in said forward stroke to allow the lowermost one cassette to be used, to drop to the bottom of said loading magazine and to be pushed into said container as said trasfer plate is carried back by said carriage during said return stroke, said pushing means comprising an element mounted on said carriage and which abuts said trasfer plate, and wherein said second limit switch has means actuated by said carriage when said carriage has pushed said transfer plate outside said loading magazine.

5. A cassette changer according to claim 4, wherein said oscillatable arm has an actuating member for actuating same and where said carriage further includes means for pulling said transfer plate with said carriage during the return stroke comprising a hook which engages said transfer plate during said return stroke, and has an element which engages said actuating member during said return stroke to effect the actuation of said oscillatable arm.

6. A cassette changer according to claim 5, wherein said actuating member comprises a shaft carrying said oscillating arm and a lever mounted thereon and wherein the distance from said shaft to the point of engagement of said oscillating arm with the used cassette is greater than the distance from said shaft to the point of engagement of said carriage element with said lever.

* * * * *